United States Patent [19]

Murray

[11] Patent Number: 4,525,022
[45] Date of Patent: Jun. 25, 1985

[54] ELECTROLYTIC CAPACITOR AND IMPROVED HEADER THEREFOR

[76] Inventor: Myles N. Murray, 15 Skyline Dr., Chagrin Falls, Ohio 44022

[21] Appl. No.: 509,248

[22] Filed: Jun. 30, 1983

[51] Int. Cl.³ .................... H01R 9/16; H01G 9/00
[52] U.S. Cl. .................... 339/220 C; 174/52 S; 429/181; 361/433
[58] Field of Search .................... 361/433, 271, 272; 174/152 R, 52 S; 29/570; 339/214 R, 214 C, 218 C, 220 R, 220 C, 220 L, 220 T, 221 R, 221 M, 276 C; 429/175, 178, 179, 180, 181, 182

[56] References Cited

U.S. PATENT DOCUMENTS 3,322,890  5/1967  Kennedy et al. ............ 174/152 R
4,047,790  9/1977  Carino ...................... 361/433 X

FOREIGN PATENT DOCUMENTS 706244  3/1954  United Kingdom ............ 361/433

*Primary Examiner*—L. T. Hix
*Assistant Examiner*—Douglas S. Lee
*Attorney, Agent, or Firm*—Maky, Renner, Otto & Boisselle

[57] ABSTRACT

In an electrolytic capacitor, there is provided an improved header for closing the open end of a capacitor can. The header includes a rigid insulating or metal body having at least one terminal passing therethrough, and a resilient elastomeric cover having inner and side walls molded about respective surfaces of the body and a tubular terminal sealing portion molded interiorly about a hole in the body through which the terminal passes. The tubular portion has formed at its inner annular wall a plurality of axially spaced apart annular sealing beads which annularly engage the terminal with compressive force to effect respective axially spaced apart line seals. When assembled under compression between axially spaced components of the can, the inner and side walls of the cover cooperate with such components to provide plural seals against leakage of electrolyte from the can about the rigid body while the tubular portion seals against leakage at the terminal. The cover, being inert and impervious to the electrolyte, further serves to isolate the rigid body from the electrolyte to preclude electrolyte loss and contamination. Also provided is a small annular flapper bead which further seals the end cap to the capacitor can when subjected to internal pressure in the can as well as by its own resilient action.

16 Claims, 5 Drawing Figures

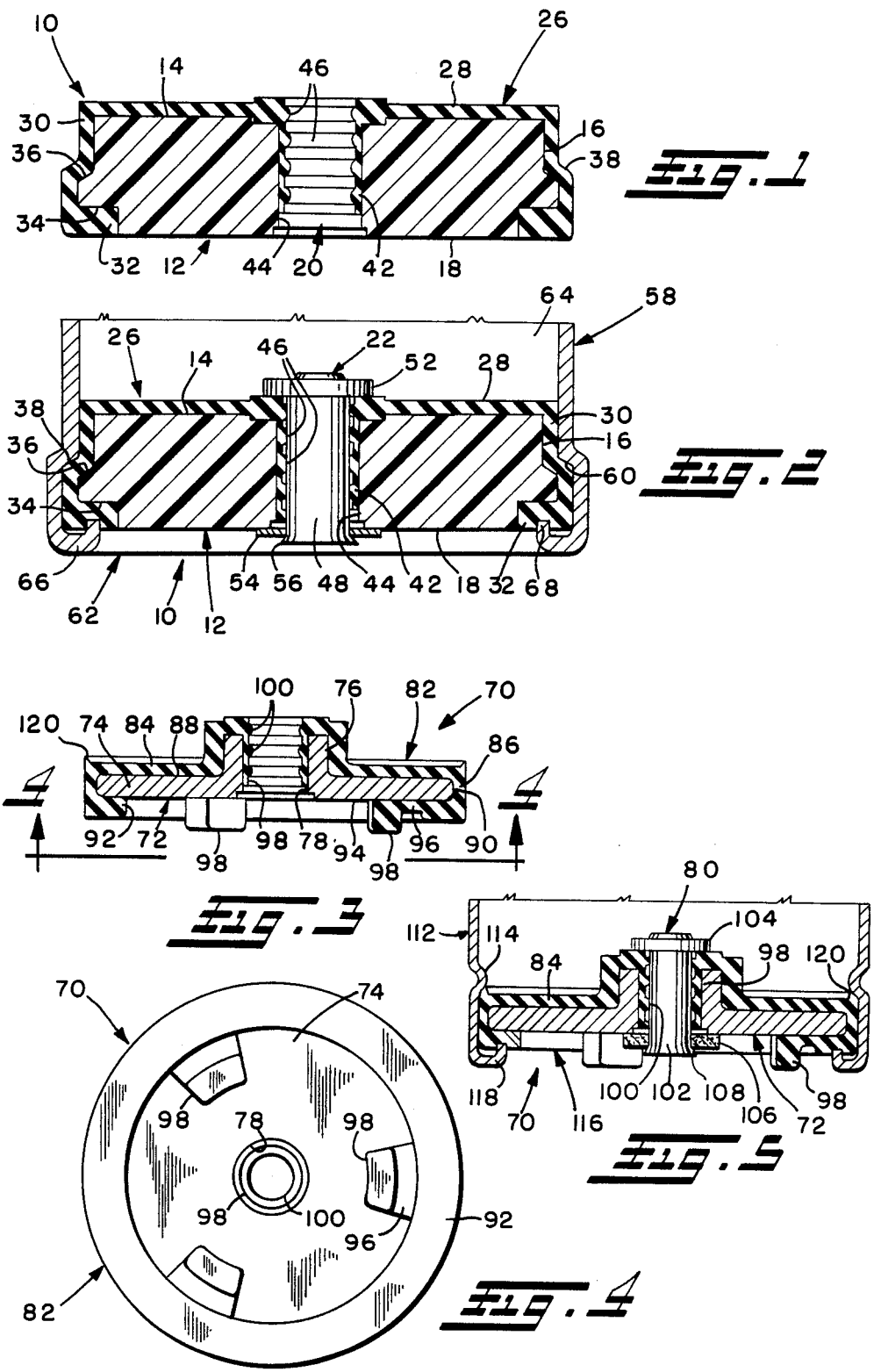

4,525,022

ELECTROLYTIC CAPACITOR AND IMPROVED HEADER THEREFOR

This invention relates generally to an electrolytic capacitor and to an improved header or end cap therefor. More particularly, the invention relates to certain improvements in the electrolytic capacitor and end cap disclosed in applicant's copending application Ser. No. 173,269, entitled "Electrolytic Capacitor and End Cap Therefor" and filed July 29, 1980.

BACKGROUND

As is well known in the capacitor art, an electrolytic capacitor structure commonly employed comprises a cylindrical metal can or container closed at one end and open at the other, various internal capacitor elements contained within the can including an electrolyte, and a header for closing the open end of the can. The header, also referred to as an end cap, may be provided with one or more terminals.

In assembly, the closure is normally obtained by inserting a disc-shape header into the open end of the can until it engages a radially inwardly projecting bead or shoulder on the inner cylindrical wall of the can adjacent its open end. This shoulder acts as a stop to prevent further axial insertion of the header. To lock the header in place in the can, the extreme or marginal end of the can is spun over or crimped about the peripheral edge of the header. Commonly, the axially outer end of the header at its peripheral edge is recessed to accommodate a separate-piece rubber gasket which is placed under compression by the spun-over or crimped marginal end of the can to seal the can against loss of electrolyte as well as entrance of moisture, air and other contaminants.

The header often is made of an insulative material which ordinarily is a molded synthetic resin of the phenolic class. The phenolic header when assembled in the capacitor heretofore has been in contact at its axially inner end with the electrolyte contained within the can. This direct contact may cause loss of electrolyte by diffusion through the end cap and/or contamination of the electrolyte by absorption of impurities from the phenolic header. This loss and contamination will usually lead to variation and degradation of electrical properties of the capacitor, as well as premature breakdown. The loss of electrolyte further may be aggravated by one or more electrical terminals inserted or embedded in the cap which provide for an electrical connection through the cap. The inner and outer ends of the terminals are exposed respectively to the interior and exterior of the can and hence any continuous gaps between the phenolic body and terminals inserted or embedded therein provide a path for leakage of electrolyte from the interior of the can. This leakage may be even more pronounced in a capacitor subjected to widely fluctuating temperatures since the metal terminals and phenolic body have different thermal expansion characteristics potentially resulting in wider gaps therebetween.

The elimination of the above noted drawbacks in such electrolytic capacitor construction is a principal object of the present invention as is the provision of a more effective seal between the header and terminal therein.

It is another object of the invention to provide a capacitor end cap or header capable of achieving the aforenoted objects which may be easily and inexpensively fabricated, and then assembled in the capacitor can in conventional manner.

SUMMARY OF THE INVENTION

The present invention, in particular, is directed to certain improvements in the electrolytic capacitor and end cap disclosed in applicant's aforementioned copending application Ser. No. 173,269. The header or end cap disclosed in such application includes a rigid-disc-shape insulating body and a resilient elastomeric cover. The rigid insulating body has electrical terminals embedded therein and has inner, outer and annular side surfaces. The resilient elastomeric cover for said body has an inner wall and an annular side wall, the inner wall overlying essentially the entire inner surface of the body and the side wall overlying the side surface of the body. The side wall of the cover has an annular radially inwardly projecting shoulder at its terminal end overlying the axially outer peripheral edge of the end cap body. The end cap is inserted into the open end of the can into engagement with an intermediate annular stop axially inwardly spaced from the open end of the can. The end of the can thereafter is radially inwardly deformed to form a marginal annular flange that engages the cover shoulder of the end cap. This engagement, which compresses the cover, forms two seals between the end cap and can at the stop and at the flange to prevent electrolyte leakage. The elastomeric cover also is impervious to the electrolyte contained within the can and effectively isolates the rigid phenolic body from the electrolyte to preclude electrolyte loss and contamination, all to the improvement of capacitor performance. The inner wall of the cover being molded in place on the rigid body further seals the end cap against leakage of electrolyte through any gaps that might exist between the rigid body and the terminals embedded therein.

In accordance with the present invention, the elastomeric cover further has a tubular portion molded interiorly about a hole in the rigid body through which a terminal passes. The tubular portion has formed at its inner annular wall a plurality of axially spaced apart, annular sealing beads which annularly engage the terminal with compressive force to effect respective axially spaced apart line seals which prevent electrolyte leakage at the terminal. The tubular portion or, more accurately, a discrete tubular sealing member may have similar application in other headers which, for example, do not require an elastomeric cover of the type described in applicant's aforementioned copending application. The rigid disc also may be made of metal whereby the elastomeric cover, inclusive of the tubular portion, serves to electrically insulate the metal body from the can and/or the terminal passing therethrough.

Further in accordance with the present invention, the terminal may be fixedly secured in the rigid body by flanges at opposite projecting ends thereof. In particular, the terminal at its inner end may have an enlarged head forming one flange which is urged into tight sealing engagement with the inner wall of the elastomeric cover when subjected to axially outwardly acting forces due to internal pressure in the can. The other flange may be formed by a washer fitted on the terminal between the rigid body and an outwardly deformed or flared hollow end of the terminal.

The header also is provided with an annular flapper bead integral with the cover which projects axially inwardly along the inner peripheral edge of the cover's inner wall. When the header is assembled in the can, the flapper bead is urged radially outwardly into tight sealing engagement with the intermediate annular stop of the can by internal pressure in the can.

To the accomplishment of the foregoing and related ends, the invention, then, comprises the features hereinafter fully described and particularly pointed out in the claims, the following description and the annexed drawings setting forth in detail certain illustrative ebodiments of the invention, these being indicative of but two of the various ways in which the principles of the invention may be employed.

BRIEF DESCRIPTION OF THE DRAWING

In the annexed drawing:

FIG. 1 is an axial section through an electrolytic capacitor header according to the invention, such being shown prior to assembly of a terminal therein;

FIG. 2 is a fragmented axial section through an electrolytic capacitor showing a terminal assembled in the header of FIG. 1 and such header as assembled to close the open end of the capacitor can;

FIG. 3 is an axial section through another form of electrolytic capacitor header according to the invention, such being shown prior to assembly of a terminal therein;

FIG. 4 is a plan view of the header of FIG. 3 as seen from the line 4—4 thereof; and FIG. 5 is a fragmented axial section through an electrolytic capacitor showing a terminal assembled in the header of FIG. 3 and such header in assembled condition to close the open end of the capacitor can.

DETAILED DESCRIPTION

Referring now in detail to the drawing and initially to FIGS. 1 and 2, a header or end cap according to the invention is designated generally by reference numeral 10 and includes a molded disc-shape body 12 of a rigid insulating material which preferably is a synthetic resin of the phenolic class. The body 12 has an inner wall or surface 14, an annular side wall or surface 16, and an outer wall or surface 18. The body 12 also has at least one axial hole or bore 20 through which passes a terminal 22.

The header further includes a cover, indicated generally by reference numeral 26, which is molded on the rigid body 12. The cover 26 is of a resilient elastomeric material that is chemically inert and impervious to the electrolyte to be used in the capacitor with which the header 10 is to be employed. It will be appreciated that many commonly available rubbers or synthetic rubbers may be used effectively, as long as the rubber selected is inert and impervious to the particular electrolyte employed.

The cover 26 has an inner wall 28 and an annular side wall 30 respectively overlying the inner surface 14 and annular side surface 16 of the body 12. The inner wall 26 covers or overlies essentially the entire inner surface 14 of the body except where the terminal 22 projects from the body whereas the annular side wall 30 extends axially outwardly from the periphery of the inner wall about the annular side surface 16 of the body. At its terminus, the annular side wall 30 has a radially inwardly extending annular shoulder or flange 32 received in a recessed seat 34 provided in the peripheral edge of the body at its axially outer end. Axially inwardly adjacent the recessed seat 34, the annular side surface 16 of the body is radially outwardly stepped to provide an inwardly tapered annular shoulder 36 to which the uniformly thick side wall 30 conforms to provide a correspondingly tapered shoulder 38.

The cover 36 also has a tubular portion 42 extending interiorly about the hole 20 in the body 12. The tubular portion is joined at its axially inner end to the inner wall 28 of the cover and extends axially from such inner wall substantially the entire axial length of the hole 20. The tubular portion also has its outer annular surface in molded contact with the interior annular wall 44 of the hole.

At its interior side, the tubular portion 42 has formed thereon a plurality of axially spaced apart, annular sealing beads 46 which generally are semi-circular in cross-section and have an inner diameter or transaxial dimension less than that of the shank 48 of the terminal 22. Accordingly, when the terminal shank 48 is inserted into the hole 20 through the tubular portion 42, the sealing beads 46 annularly engage and grip the outer annular surface of the shank to effect respective axially spaced apart line seals which will prevent passage of electrolyte along such terminal shank. The beads further are urged with compressive force into tight sealing engagement with the terminal shank by reason of the tubular portion having an overall annular thickness less than the thickness of the annular space formed between the terminal shank and the interior annular wall 44 of the hole.

The terminal 22 has an integral, diametrically enlarged head or flange 52 at the inner axial end of the shank 48 which bears against the inner wall 28 of the cover 26 upon full insertion of the terminal into the body 12. The other or outer axial end of the shank projects axially beyond the outer surface 18 of the body 12 so that a washer 54 can be fitted thereon and against such outer surface 18. With the washer thusly assembled on the terminal, the hollow distal end of the terminal shank is radially outwardly deformed or flared at 56 to a diameter greater than that of the hole in the washer 54 so as to fixedly lock the washer against the body. In this manner, the terminal is axially fixed in the header. During the flaring operation, sufficient pressure may be applied so as to place the inner wall 28 under axial compression between the terminal head and rigid body.

The header 10 may thereafter be assembled in a conventional capacitor can or container 58. The can is cylindrical and usually has a closed end (not shown) and an open end. At its open end, the can may be radially outwardly stepped to form an inclined annular shoulder or stop 60 at a location axially inwardly spaced from the extreme end 62 of the can.

To assemble the capacitor unit, electrolyte 64 and conventional internal capacitor elements are placed in the can 58 by passage through its open end. The header 10 is then inserted into the open end of the can until the annular shoulder 38 of the header cover 26 engages the annular stop 60 to limit further axial insertion. Preferably, this is effected with a force fit by reason of the side wall 30 of the cover 26 being radially compressed between the side surface 16 of the body 12 and the inner wall surface of the can over corresponding concentric portions thereof. The end 62 of the can is then spun over or crimped about the peripheral edge of the header at its axially outer end to form a marginal flange 66 that may engage the cover flange 32. Preferably, the end of the marginal flange is rebent upon itself as shown to form an annular sealing barb 68 which partially is embedded in the cover flange 32 to enclose the rough edge of the can, thereby to preclude possible injury to persons handling the capacitor. Sufficient pressure is applied during the spinning or crimping operation so as to place the side wall 30 of the cover under axial compression between the annular stop 60 and the annular shoulder 36 of the rigid body and the cover flange 32 under axial compression between the sealing barb 68 and the recessed seat 34 of the rigid body. As will be appreciated, the pinch between the correspondingly tapered shoulder 60 and annular shoulder 36 will effect a tight seal between the cover side wall 30 and the inner wall surface of the can.

It also will be appreciated that loss of electrolyte by diffusion through the header 10 will be substantially or completely prevented by virtue of the elastomeric cover 26 that is impervious to the electrolyte. The cover isolates the phenolic body 12 from the electrolyte 64 contained within the interior of the can 58 to preclude such diffusion. In addition, the cover precludes any impurities in the phenolic body from being absorbed into the electrolyte to avoid contamination.

Referring now to FIGS. 3–5, another form of header according to the invention is designated generally by reference numeral 70. The header 70 includes a rigid metal body 72 having an annular flange or disc portion 74 and an axially inwardly extending boss 76 which contains a hole 78 through which a terminal 80 passes. Molded about such body is a resilient elastomeric cover 82 having an inner wall 84 and an annular side wall 86 which respectively overlie and conform to the inner surface 88 and side surface 90 of the body. At its terminus, the annular side wall 86 includes a radially inwardly extending annular flange 92 which overlies the outer surface 94 of the body at its peripheral edge. Integrally connected to such flange by respective short webs 96 are circumferentially arranged feet 98 which project axially outwardly beyond such flange.

The cover 82 also has a tubular portion 98 extending interiorly about the hole 78 in the body 72. Such terminal portion has formed at its inner annular wall a plurality of axially spaced apart, annular sealing beads 100 which annularly engage the shank 102 of the terminal 80 with compressive force to effect respective axially spaced apart line seals which prevent electrolyte leakage at the terminal. The terminal is axially fixed in the header by an integral flange or head 104 at the inner axial end of the shank 102 and a washer 106 fitted on the axial outer end of the shank and locked as by flaring the hollow distal end of the shank as seen at 108. if electrical contact between the terminal and metal body is not desired, a rigid fiber or other electrically insulating washer may be employed in place of a metal washer.

As seen in FIG. 5, the illustrated capacitor can or container 112 has at its side wall an intermediate inwardly projecting bead 114 formed thereon as by spinning or crimping the can at a location axially inwardly spaced from the extreme end 116 of the can. The inwardly projecting annular bead forms an annular stop for the header 70 upon insertion into the can. After the header is inserted, the end of the can is spun over or crimped about the peripheral edge of the header to form a rebent marginal flange 118 partially embedded in the cover flange 92, thereby to place the side wall 86 of the cover under compression between the flange 118, rigid body 72 and annular stop 114.

The cover 82 also has an annular flapper bead 120 which projects axially inwardly from the inner peripheral edge of the cover. When engaged with the intermediate annular stop 114 of the can as shown, the flapper bead closely conforms to the shape of such stop along its annular area of engagement therewith. Because the flapper bead projects axially inwardly beyond the inner wall 84 of the cover, such bead has a radially inner surface against which internal pressure in the can will act to urge such bead radially outwardly into tight sealing engagement with the annular stop 114.

In view of the foregoing, there is provided an improved header or end cap and an improved electrolytic capacitor or condenser employing same which, in particular, has improved sealing and assembly characteristics, thereby leading to improved capacitor performance as well as ease in assembly thereof. In particular, there is provided an improved seal at a terminal insert fixed in the header.

Although the invention has been shown and described with respect to preferred embodiments, it is obvious that equivalent alterations and modifications will occur to others skilled in the art upon reading and understanding of the specification. The principles of the invention may be employed, for example, in capacitors have non-cylindrical cans and headers rather than the cylindrical can and header described and shown herein. The present invention includes all such equivalent alterations and modifications, and is limited only by the scope of the following claims.

I claim:

1. A capacitor header into which a terminal may be assembled, comprising: a rigid body having an axial hole for receipt of the terminal, and a resilient elastomeric tubular sealing element extending interiorly about said hole, said sealing element having plural axially spaced apart annular sealing beads at its interior side which extend transaxially inwardly for compression by the terminal upon assembly in said hole to form respective axially spaced apart line seals between the terminal and said sealing element.

2. A header as set forth in claim 1, wherein said tubular sealing element has an outer annular side in molded contact with the interior annular wall of said hole.

3. A header as set forth in claim 1, wherein said rigid body has an inner surface, a side surface and an outer surface, and said tubular sealing element is integrally formed with a resilient elastomeric cover molded about said body, said cover having an inner wall and a side wall, said inner wall covering said inner surface of said body, and said side wall covering said side surface of said body and terminating at an annular radially inwardly projecting flange covering said outer surface of said body at its peripheral edge, whereby said side wall of said cover may be compressed when the header is assembled in the open end of an electrolytic capacitor can to seal such side wall to the can to contain electrolyte in the can while the inner wall of said cover isolates said ridig body from the electrolyte contained in the can and further while the tubular sealing element seals against electrolyte loss at the terminal.

4. A header as set forth in claim 3, wherein said cover has an annular flapper bead projecting axially inwardly from the inner peripheral edge of said inner wall.

5. A header for closing the open end of an electrolytic capacitor can, comprising a terminal, a rigid body having an axial hole for receipt of said terminal, and a resilient elastomeric tubular sealing element extending about said terminal in said hole, said tubular sealing element having formed at its inner annular wall a plurality of axially spaced apart, annular sealing beads which annularly engage said terminal with compressive force to effect respective axially spaced apart line seals which prevent electrolyte leakage at the terminal.

6. A header as set forth in claim 5, wherein said tubular sealing element has an outer annular surface in molded contact with the interior annular wall of said hole.

7. A header as set forth in claim 5, wherein said rigid body has an inner surface, a side surface and an outer surface, and said tubular sealing element is integrally formed with a resilient elastomeric cover molded about said body, said cover having an inner wall and a side wall, said inner wall covering said inner surface of said body, and said side wall covering said side surface of said body and terminating at an annular radially inwardly projecting shoulder covering said outer surface of said body at its peripheral edge.

8. A header as set forth in claim 7, wherein said terminal has a shank extending through said tubular sealing element and an enlarged head at the inner axial end of said shank, and means are provided to axially fix said terminal in said body with the inner wall of said cover placed under compression between said head and inner surface of said body to effect a further seal at said terminal.

9. A header as set forth in claim 7, wherein said cover has an annular flapper bead projecting axially inwardly from the inner peripheral edge of said inner wall.

10. In an electrolytic capacitor of the type including a metal can open at one end, an electrolyte in the can and a header to close such open end of the can to contain the electrolyte, the improvement comprising a header including a terminal, a rigid body having an axial hole for receipt of said terminal, and a resilient elastomeric tubular sealing element extending annularly about said terminal in said hole, said tubular sealing element having formed at its inner annular wall a plurality of axially spaced apart, annular sealing beads which annularly engage the terminal with compressive force to effect respective axially spaced apart line seals which prevent electrolyte leakage at the terminal.

11. The improvement of claim 10, wherein said tubular sealing element has an outer annular surface in molded contact with the interior annular wall of said hole.

12. The improvement of claim 10, wherein said rigid body has an inner surface, a side surface and an outer surface, and wherein said tubular sealing element is integrally formed with a resilient elastomeric cover molded about said body, said cover including an inner wall and side wall respectively covering the inner wall and side wall of said rigid body, said side wall of said resilient cover being compressed when the partially covered end cap is assembled in the open end of the can to seal such side wall of the resilient cover to the can to retain the electrolyte in the can while the inner wall of the elastomeric cover isolates the rigid insulating body from the contained electrolyte and further while the tubular sealing element prevents electrolyte leakage at the terminal.

13. The improvement of claim 12, wherein said can has a side wall, an annular stop on said side wall adjacent the open end of said can and a marginal flange on said side wall at said open end, the side wall of said resilient cover being compressed between said stop and said marginal flange to form at least two seals between said resilient cover and said can at said stop and said marginal flange.

14. The improvement of claim 13, wherein said cover has an annular flapper bead projecting axially inwardly from the inner peripheral edge of said inner wall for engagement with said stop on said side wall, said bead having a radially inner annular surface exposed to internal pressure in said can whereby such internal pressure will urge said bead into tight sealing engagement with said stop.

15. The improvement of claim 12, wherein said terminal has a shank extending through said tubular sealing element and an enlarged head at the inner axial end of said shank, and means are provided to axially fix said terminal in said body with the inner wall of said cover placed under compression between said head and inner surface of said body to effect a further seal at said terminal.

16. The improvement of claim 10, wherein said rigid body has an annular flange portion and an axially inwardly extending boss which contains said hole through which said terminal extends.

* * * * *